(12) United States Patent
Teyssedre et al.

(10) Patent No.: US 7,538,053 B2
(45) Date of Patent: May 26, 2009

(54) COMPOSITION OF GLASS FOR THE PRODUCTION OF GLAZING

(75) Inventors: Laurent Teyssedre, Paris (FR); Dominique Sachot, Ozoire la Ferriere (FR)

(73) Assignee: Saint-Gobain Glass France, Courbevoie (FR)

( * ) Notice: Subject to any disclaimer, the term of this patent is extended or adjusted under 35 U.S.C. 154(b) by 738 days.

(21) Appl. No.: 10/508,005

(22) PCT Filed: Mar. 19, 2003

(86) PCT No.: PCT/FR03/00868

§ 371 (c)(1), (2), (4) Date: Feb. 1, 2005

(87) PCT Pub. No.: WO03/080527

PCT Pub. Date: Oct. 2, 2003

(65) Prior Publication Data

US 2006/0234849 A1    Oct. 19, 2006

(30) Foreign Application Priority Data

Mar. 27, 2002    (FR) .................................. 02 03873

(51) Int. Cl.
*C03C 3/087* (2006.01)
(52) U.S. Cl. .......................................... 501/70; 501/71
(58) Field of Classification Search .................... 501/70, 501/71
See application file for complete search history.

(56) References Cited

U.S. PATENT DOCUMENTS 5,364,820 A * 11/1994 Morimoto et al. ............. 501/71
6,114,264 A * 9/2000 Krumwiede et al. .......... 501/70
6,395,659 B2 * 5/2002 Seto et al. .................... 501/64
7,179,763 B2 * 2/2007 Teyssedre et al. ............. 501/71
2004/0171473 A1 9/2004 Teyssedre et al.
2005/0032624 A1 * 2/2005 Teyssedre et al. ............. 501/71
2006/0234849 A1 10/2006 Teyssedre et al.

FOREIGN PATENT DOCUMENTS

| EP | 0 565 882 | 10/1993 |
| EP | 0 653 386 | 5/1995 |
| EP | 1 000 910 | 5/2000 |
| WO | 00 76928 | 12/2000 |
| WO | WO 03004427 A * | 1/2003 |

OTHER PUBLICATIONS

U.S. Appl. No. 10/593,329, filed Sep. 19, 2006, Teyssedre, et al.
U.S. Appl. No. 10/542,925, filed Jul. 21, 2005, Teyssedre.
U.S. Appl. No. 10/508,005, filed Sep. 24, 2004, Teyssedre, et al.

* cited by examiner

*Primary Examiner*—Karl E Group
*Assistant Examiner*—Elizabeth A Bolden
(74) *Attorney, Agent, or Firm*—Oblon, Spivak, McClelland, Maier & Neustadt, P.C.

(57) ABSTRACT

A glass composition of the soda-lime-silicate type is described which includes, by weight, the following coloring agents: 0.2-0.45% of $Fe_2O_3$ (total iron), 2-8 ppm of Se, 0-20 ppm of CoO, and 0-80 ppm of NiO. The coloring agents satisfy the relationship, $0.7<(200\times NiO)+(5000\times Se)+(6\times Fe^{3+})/(875\times CoO)+(24\times Fe^{2+})<1.6$ in which the NiO, Se, $Fe^{3+}$, CoO and $Fe^{2+}$ contents are expressed in ppm, $Fe^{3+}$ and $Fe^{2+}$ are the content of ferric iron expressed in the form of $Fe_2O_3$ and FeO, respectively. The composition has a redox from 0.28 to 0.5, an overall light transmission under illuminant A ($T_{LA}$) greater than 65% and a selectivity (SE) of greater than 1.25, when measured for a thickness of 3.85 mm. A window formed from at least one glass sheet produced from the aforementioned composition is also described.

16 Claims, No Drawings

COMPOSITION OF GLASS FOR THE PRODUCTION OF GLAZING

The present application is the national stage application of WO 03/080527, and claims the priority to the French application No. 02/03873 filed on Mar. 27, 2002, the text of which is incorporated herein by reference.

The invention relates to a glass composition of the soda-lime-silicate type intended for the production of neutral glass with a blue, gray or bronze tint which possesses a high light transmission and a moderate energy transmission. Although the invention is not limited to such an application, it will be more particularly described with reference to automobile applications, especially for forming windshields and side windows located at the front of a vehicle.

Windows intended for the automobile industry are subject to requirements of various kinds. With regard to optical properties, these requirements are governed by regulations, as in the case of the light transmission of a windshield, or concern the comfort of the user, for example when it is a question of limiting the heat inside the passenger compartment by having glass exhibiting as low an energy transmission as possible.

Apart from the requirements relating to light transmission and to energy transmission, the windows located at the front of vehicles must satisfy the esthetic desires of automobile manufacturers as regards color, in particular relative to the dominant wavelength and to purity.

To obtain a blue, gray or bronze glass, it is known to add coloring agents to the batch materials intended to be melted in order to produce the glass matrix, these being such as iron, selenium, nickel, cobalt, chromium, manganese or rare earths, for example cerium or erbium.

However, it is still difficult to obtain glasses that combine a particular color, in terms of wavelength range and excitation purity, with specific characteristics, for example light transmission and energy transmission factors within a well-defined range of values. This is because it is recognized that not only is the color of the glass modified by the addition of a coloring agent or the substitution of one coloring agent with another and/or a change in the quantity or in the relative proportion of the coloring agents in a composition, but also that this may affect its light transmission and its structural qualities. For example, increasing the iron oxide content in a soda-lime-silicate composition for the purpose of improving the absorption of infrared and ultraviolet radiation gives a glass highly colored in the green, which is manifested by an increase in the excitation purity.

In the automobile sector, the current trend is toward windows with a neutral tint, having as low an excitation purity as possible, so that they can be harmoniously integrated into the vehicle as a whole.

Neutral gray glass obtained from compositions containing iron oxide, cobalt oxide and selenium and/or nickel oxide is already known.

WO-A-96/04212 discloses a glass composition of neutral tint for automobiles, which comprises 0.3 to 0.7% of total iron ($Fe_2O_3$), 3 to 25 ppm of cobalt ($Co_3O_4$), 0.5 to 10 ppm of selenium and optionally nickel oxide and/or titanium oxide. The glass obtained possesses an excitation purity of less than 6%.

In EP-A-0 653 386, compositions have been proposed for obtaining gray glass that can be used for automobiles. Such glass is characterized in that it contains either 0.3 to 0.7% iron oxide, 3 to 50 ppm cobalt oxide and 1 to 15 ppm selenium, or 0.15 to 0.6% iron oxide, 15 to 55 ppm cobalt oxide and 25 to 350 ppm nickel oxide, and optionally up to 5 ppm selenium.

EP-A-0 677 492 has disclosed a gray-green glass having a purity of less than 1.6% under illuminant C. The glass is obtained from a composition containing 0.45 to 0.95% iron oxide, 8 to 30 ppm cobalt and one or more of the following compounds: selenium (0-10 ppm), $MnO_2$ (0-0.5%) and NiO (0-30 ppm).

FR-A-2 738 239 discloses a clear gray glass composition with a tint varying between greenish and bluish, which contains 0.25 a 0.60% iron, 10 to 40 ppm cobalt and 5 to 30 ppm selenium. The glass possesses a glass excitation purity not exceeding 6% and a selectivity of greater than 1.1.

It is also known from WO-A-00/76928 that neutral gray glass can be obtained from compositions containing iron oxide (0.3-0.7%), selenium (1-15 ppm) and optionally cobalt oxide (0-15 ppm). The glass produced exhibits a standard color shift of less than 6.

Automobile manufacturers are faced with ever greater requirements in terms of windows. Thus, they wish to have available colored glass which, in addition to its optical and energy properties, allows the perception of the color that an observer located outside the vehicle may have of the interior elements, such as the fabric of the seats or the dashboard, to be unmodified. The property of a glass not to impair vision is measured by the <<(color rendering index )>> which is defined in European Standard EN 410:1998. Thus, when the color rendering index is close to 100, there is no difference in coloration between the elements seen by the observer inside the passenger compartment and outside the latter.

One objective of the present invention is to provide a glass composition of the soda-lime-silicate type which has a very neutral coloration with a bluish, gray or bronze tint, an overall light transmission under illuminant A ($T_{LA}$) compatible with a use as a front window of an automobile, in particular a windshield, and a satisfactory overall energy transmission ($T_E$), this composition furthermore possessing a high color rendering index.

Another objective of the invention is to provide a glass composition that can be made into sheet on the surface of a bath of metal using the float glass technique, under oxidation-reduction conditions similar to those usually employed for a standard float glass and for a similar cost.

These objectives are achieved according to the invention thanks to a glass composition of the soda-lime-silicate type, which comprises the constituents below within the following limits by weight:

| | |
|---|---|
| $SiO_2$ | 64-75% |
| $Al_2O_3$ | 0-5% |
| $B_2O_3$ | 0-5% |
| CaO | 5-15% |
| MgO | 0-5% |
| $Na_2O$ | 10-18% |
| $K_2O$ | 0-5% | and the coloring agents below within the following limits by weight:

| | |
|---|---|
| $Fe_2O_3$ (total iron) | 0.2-0.45% |
| Se | 2-8 ppm |
| CoO | 0-20 ppm |
| NiO | 0-80 ppm | said agents satisfying the following relationship:

$0.7 < (200 \times NiO)+(5000 \times Se)+(6 \times Fe^{3+})/(875 \times CoO)+(24 \times Fe^{2+}) < 1.6$ in which the NiO, Se, $Fe^{3+}$, CoO and $Fe^{2+}$ contents are expressed in ppm, $Fe^{3+}$ being the content of ferric iron expressed in the form of $Fe_2O_3$ and $Fe^2+$ being the content of ferrous iron expressed in the form of FeO, and the composition having a redox varying from 0.28 to 0.5, an overall light transmission under illuminant A ($T_{LA}$) greater than 65% and a selectivity (SE) of greater than 1.25, these being measured for a thickness of 3.85 mm.

Within the context of the present invention, the selectivity SE is defined as being the ratio of the light transmission factor under illuminant A ($T_{LA}$) to the energy transmission factor ($T_E$) for a glass thickness of 3.85 mm.

Likewise, the redox is defined by the ratio of the FeO content to the total iron content, expressed in the form of $Fe_2O_3$, the contents being expressed in percentages by weight.

Hereafter, R1 denotes the ratio:

$(200 \times NiO)+(5000 \times Se)+(6 \times Fe_2O_3)/(875 \times CoO)+(24 \times FeO)$.

The glass composition according to the present invention possesses an excitation purity less than or equal to 2%, preferably less than 1%.

In general, the glass composition is of neutral gray color and its tint is balanced by the respective contents of the coloring agents as indicated above. Control of the tint, defined by its dominant wavelength ($\lambda d$), is made possible by keeping the coloring agents within the limits indicated above. Thus, when the value of the ratio of the aforementioned coloring agents is:

- less than 0.8, a blue tint ($\lambda_d$ of around 490 to 500 nm) is obtained;
- between 0.8 and 1.25, the glass formed is gray without any particular tint;
- greater than 1.25, a bronze tint ($\lambda_d$ of around 540 to 560 nm) is obtained.

It should be emphasized here the role played by the NiO, which allows the tint to be varied over a wide range, without however significantly reducing the light transmission, as Se and CoO may do. Furthermore, the NiO content used remains low, which makes it possible to reduce the risk of the NiO combining with sulfur-containing compounds, such as the sulfate used as glass refining agent, to form beads of nickel sulfide. The presence of these beads within the glass gives windows that have a tendency, after having undergone the toughening step, of breaking when they are exposed to sunlight for long periods.

A first series of preferred compositions according to the invention makes it possible to obtain neutral gray glass having a purity of less than 1% and a color rendering index of at least 96. These compositions comprise the coloring agents below within the following limits by weight:

| | |
|---|---|
| $Fe_2O_3$ (total iron) | 0.2-0.3% |
| Se | 2-8 ppm |
| CoO | 0-20 ppm |
| NiO | 0-5 ppm | and the composition having a redox of greater than 0.4, preferably greater than 0.45.

The particularly preferred glass compositions are devoid of NiO and comprise:

| | |
|---|---|
| $Fe_2O_3$ (total iron) | 0.2-0.25% |
| Se | 4-7 ppm |
| CoO | 10-20 ppm. |

A second series of preferred compositions according to the invention makes it possible to obtain glass having a selectivity of greater than 1.3 and advantageously greater than 1.35. Such compositions make it possible to form automobile windows that satisfy the requirements relating to thermal comfort of persons in the passenger compartment and relating to light transmission. These compositions comprise the coloring agents below within the following limits by weight:

| | |
|---|---|
| $Fe_2O_3$ (total iron) | 0.35-0.45% |
| Se | 2-8 ppm |
| CoO | 0-10 ppm |
| NiO | 0-80 ppm | and the composition having a redox of greater than or equal to 0.34.

The particularly preferred glass compositions comprise:

| | |
|---|---|
| $Fe_2O_3$ (total iron) | 0.39-0.45% |
| Se | 3-6 ppm |
| CoO | 0-6 ppm |
| NiO | 0-15 ppm. |

The glass composition according to the invention makes it possible to form glass having a high color rendering index, at least equal to 94, and more often than not greater than 96. This index, defined according to the EN410:1998 standard, makes it possible to assess the variations in coloration through a window of the glass to be tested from control specimens of a given color that are illuminated by a reference illuminant ($D_{65}$). The glass with an index greater than 90 is considered as having a very good color rendering.

In the glass according to the invention, the silica is generally maintained within very narrow limits for the following reasons: above about 75%, the viscosity of the glass and its ability to devitrify greatly increase, which makes it more difficult for the glass to melt and to flow on a bath of molten tin, while below 64% the hydrolytic resistance of the glass rapidly decreases.

This reduction in the hydrolytic resistance of the glass may be compensated, at least in part, by the introduction of $Al_2O_3$, but this oxide contributes to increasing its viscosity and reducing the transmission in the visible. Consequently, it is envisioned to use it only in a very small amount.

The alkali metal oxides $Na_2O$ and $K_2O$ facilitate melting of the glass. $K_2O$ may be used up to about 5%, since above this the problem of the high cost of the composition arises. The sum of the $Na_2O$ and $K_2O$ contents, expressed as percentages by weight, is preferably equal to or greater than 13%.

Alkaline-earth metal oxides play a key role in obtaining the properties of the glass according to the invention.

As regards the oxide MgO, according to a first embodiment of the invention, its content is advantageously greater than 2%, especially for economic reasons.

According to another embodiment, its content is less than 2%. This is because it has been demonstrated that limiting the MgO content to 2% has the effect of shifting the maximum in the FeO absorption band toward longer wavelengths, thus making it possible to increase the infrared absorbtivity without impairing the transmission in the visible. Complete elimination of MgO, which plays an important role in the viscosity, may be compensated for, at least in part, by increasing the content of $Na_2O$ and/or $SiO_2$.

BaO makes it possible to increase the light transmission, and it may be added to the composition according to the invention with a content of less than 4%. This is because BaO has a much smaller effect than MgO and CaO on the viscosity of the glass. Within the context of the invention, the increase in BaO takes place essentially to the detriment of the alkali metal oxides, MgO and especially CaO. Any significant increase in BaO therefore contributes to increasing the viscosity of the glass, especially at low temperatures. In addition, introducing a high percentage of BaO substantially increases the cost of the composition. Preferably, the glass according to the invention contains no BaO. When it does contain BaO, its content is preferably between 0.5 and 3.5% by weight.

Apart from complying with the limits defined above for the variation in the content of each alkaline-earth metal oxide, it is preferable in order to obtain the desired transmission properties to limit the sum of the percentages of MgO, CaO and BaO by weight to a value equal to or less than 14%.

The glass composition may furthermore include at least one optical absorption agent, such as $CeO_2$, $TiO_2$, $V_2O_5$, $WO_3$, $La_2O_3$, etc. The total content of this (these) agent(s) is generally maintained at less than 1% by weight of the composition, and preferably less than 0.5%.

The glass obtained from the compositions according to the invention may also contain up to 1% of other constituents provided by the impurities in the glass raw materials and/or by introducing recycled cullet into the glass batch and/or by using a refining agent ($SO_3$, Cl, $Sb_2O_3$, $As_2O_3$).

The glass obtained from the compositions according to the invention may be produced under conditions that make it possible to achieve the desired degree of oxidation-reduction (redox), which remains however less than 0.5. Such glass may thus be produced in the presence of known refining agents, such as sulfates. To facilitate melting, and especially to make this mechanically useful, the glass matrix advantageously has a temperature, corresponding to a viscosity $\eta$ such that $\log\eta=2$, which is less than 1500° C. More preferably, especially when it is desired to obtain the glass in the form of a glass ribbon using the float glass technique, the matrix has a temperature corresponding to the viscosity $\eta$, expressed in poise, such that $\log\eta=3.5$ (denoted by $T_{log\eta=3.5}$) and a liquidus temperature (denoted by $T_{liq}$) which satisfy the equation:

$$T_{log\eta=3.5}-T_{liq}>20° C.,$$

and preferably the equation:

$$T_{log\eta=3.5}-T_{liq}>50° C.$$

A better appreciation of the advantages of the present invention will be gained from the examples of glass compositions given below.

In these examples, the values of the following properties, measured for a thickness of 3.85 mm, are indicated:
 the overall light transmission factor under illuminant A $CT_{LA}$);
 the overall energy transmission factor ($T_E$) integrated between 295 and 2100 nm according to the ISO 9050 standard (Parry Moon, air mass 2);
 the selectivity (SE), defined as being the ratio $T_{LA}/T_E$;
 the dominant wavelength ($\lambda_d$) under illuminant $D_{65}$;
 the excitation purity ($P_{D65}$) under illuminant $D_{65}$; and
 the overall color rendering index ($R_a$) as defined in the EN410:1998 standard (glass used in constructions: determination of light and solar characteristics of glazing).

The light transmission ($T_{LA}$), the dominant wavelength ($\lambda_d$) and the purity (P) were calculated using the 1931 CIE (Commission Internationale de l'Eclairage) calorimetric reference observer.

Each of the compositions given in the table was produced from the following glass matrix, the contents of which are expressed as percentages by weight, each being corrected in terms of silica in order to be adjusted to the total content of coloring agents added:

| | |
|---|---|
| $SiO_2$ | 71.00% |
| $Al_2O_3$ | 0.70% |
| CaO | 8.90% |
| MgO | 3.80% |
| $Na_2O$ | 14.10% |
| $K_2O$ | 0.10%. |

The temperatures $T_{log\eta=2}$ and $T_{log=3.5}$, corresponding to the viscosities, expressed in poise, such that $\log\eta=2$ and $\log\eta=3.5$ respectively, together with the liquidus temperature $T_{liq}$ are identical for all the glass compositions given (these being produced from the same glass matrix) and are the following:

| | |
|---|---|
| $T_{log\eta=2}$ | 1410° C. |
| $T_{log\eta=3.5}$ | 1100° C. |
| $T_{liq}$ | 1060° C. |

The glass compositions shown in FIGS. 1 to 40 are in accordance with the invention.

The compositions of examples 41 to 44 are given as comparative examples. Examples 41 to 43 define compositions that contain a substantial quantity of CoO, NiO and Se respectively, and therefore that have a lower R1 ratio (example 41) or a higher R1 ratio (examples 42 and 43) than the compositions according to the invention. The composition of example 44 was produced under relatively reducing conditions (low redox value).

Examples 1 to 40 according to the invention show that the use of iron oxide (in $Fe_2O_3$ and FeO form), CoO, NiO and Se coloring agents in proportions that satisfy the R1 ratio makes it possible to obtain glasses glasses that are very neutral (purity $\leq 2\%$) having a high color rendering index ($\geq 94$) and a high selectivity ($\geq 1.25$) and that meet the optical constraints. The examples also show the very strong influence that small variations in the cobalt, nickel and selenium contents can have, allowing the dominant wavelength of the glass to be very finely controlled and the desired tint to be obtained, which may range from blue to bronze passing through gray tints.

Examples 5, 16, 18, 21, 25 and 34 to 37 belong to the first series of compositions as defined above, which make it possible to obtain very neutral gray glass (purity $\leq 1\%$) having a color rendering index of at least 96.

The compositions given in examples 1, 3, 4, 6, 8 to 12, 15, 20, 22, 26, 28 and 31 to 32 are representative of the aforementioned second series, making it possible to form glass of high selectivity (SE ≧1.35).

Any glass obtained from the compositions according to the invention is compatible with the usual techniques for manufacturing flat glass. The thickness of the glass ribbon obtained by sheeting out the molten glass on a bath of tin may be up to 20 mm, and in general this will vary between 0.8 and 10 mm.

Window glass (obtained by cutting the glass ribbon) may subsequently undergo a bending and/or enameling operation, especially when it is used for automobile windows.

To produce windshields or side windows, the window glass is initially cut from a glass ribbon whose thickness generally varies between 3 and 5 millimeters. With these thicknesses, the glass ensures good thermal comfort. The windshields or side windows in question may be laminated, in which case they are formed from several glass sheets, at least one of which is obtained from the composition according to the invention. Preferably, these windows comprise at least one glass sheet having an overall light transmission under illuminant A ($T_{LA}$) of at least 70% for a thickness of 3.85 mm.

The windows falling within the scope of the present invention may be subjected beforehand to surface treatments or may receive, for example, an organic coating, such as a polyurethane-based film with antilacerating properties, or a film that provides sealing should a window shatter.

These windows may also be coated with at least one metal oxide layer obtained by high-temperature chemical deposition using pyrolysis or chemical vapor deposition (CVD) or vacuum deposition techniques.

TABLE 1

|  | 1 | 2 | 3 | 4 | 5 | 6 | 7 | 8 |
|---|---|---|---|---|---|---|---|---|
| $Fe_2O_3$ (%) | 0.4 | 0.24 | 0.4 | 0.3 | 0.25 | 0.4 | 0.25 | 0.4 |
| Redox | 0.35 | 0.50 | 0.48 | 0.47 | 0.48 | 0.35 | 0.48 | 0.35 |
| CoO (ppm) | 5 | 15 | 0 | 5 | 10 | 5 | 5 | 0 |
| NiO (ppm) | 5 | 0 | 0 | 5 | 0 | 0 | 0 | 10 |
| Se (ppm) | 4.6 | 5.9 | 8 | 5.6 | 5.6 | 4.6 | 3.8 | 5.1 |
| $Cr_2O_3$ (ppm) |  |  |  |  |  |  |  |  |
| R1 | 1.02 | 0.86 | 1.13 | 0.99 | 0.93 | 0.99 | 0.78 | 1.26 |
| $T_{LA}$ (%) | 72.4 | 71.2 | 67.5 | 71.7 | 72.8 | 72.6 | 76.26 | 72.9 |
| $T_E$ (%) | 52.9 | 55.3 | 45.2 | 52.8 | 55.8 | 53.0 | 57.5 | 52.9 |
| SE | 1.369 | 1.289 | 1.492 | 1.358 | 1.304 | 1.369 | 1.326 | 1.378 |
| $P_{D65}$ (%) | 1.36 | 0.89 | 1.71 | 1.16 | 0.96 | 1.44 | 1.19 | 1.94 |
| $\lambda_d$ (nm) | 508 | 508 | 533 | 510 | 528 | 506 | 503 | 542 |
| $R_a$ | 94.59 | 95.87 | 94.26 | 95.12 | 96.16 | 94.52 | 95.48 | 95.39 |

|  | 9 | 10 | 11 | 12 | 13 | 14 | 15 |
|---|---|---|---|---|---|---|---|
| $Fe_2O_3$ (%) | 0.4 | 0.4 | 0.4 | 0.4 | 0.25 | 0.25 | 0.4 |
| Redox | 0.36 | 0.35 | 0.40 | 0.35 | 0.44 | 0.48 | 0.35 |
| CoO (ppm) | 5 | 0 | 0 | 5 | 15 | 5 | 10 |
| NiO (ppm) | 5 | 35 | 20 | 10 | 75 | 60 | 0 |
| Se (ppm) | 5.8 | 2.1 | 5.6 | 4.6 | 2.6 | 4.6 | 4.6 |
| $Cr_2O_3$ (ppm) |  |  |  |  |  |  |  |
| R1 | 1.13 | 0.96 | 1.18 | 1.04 | 0.90 | 1.27 | 0.89 |
| $T_{LA}$ (%) | 70.7 | 75.4 | 70.9 | 72.1 | 72.5 | 72 | 71.3 |
| $T_E$ (%) | 51.4 | 54.27 | 49.7 | 52.8 | 57.17 | 55.4 | 52.5 |
| SE | 1.375 | 1.389 | 1.427 | 1.366 | 1.267 | 1.300 | 1.356 |
| $P_{D65}$ (%) | 1.40 | 1.93 | 1.73 | 1.31 | 1.21 | 1.98 | 1.95 |
| $\lambda_d$ (nm) | 528 | 502 | 534 | 500 | 507 | 547 | 499 |
| $R_a$ | 95.11 | 94 | 94.71 | 94.6 | 95.25 | 96.15 | 94.03 |

TABLE 2

|  | 16 | 17 | 18 | 19 | 20 | 21 | 22 | 23 |
|---|---|---|---|---|---|---|---|---|
| $Fe_2O_3$ (%) | 0.25 | 0.25 | 0.22 | 0.3 | 0.4 | 0.22 | 0.45 | 0.28 |
| Redox | 0.44 | 0.48 | 0.50 | 0.37 | 0.35 | 0.48 | 0.36 | 0.36 |
| CoO (ppm) | 0 | 14 | 16 | 12 | 10 | 11 | 5 | 0 |
| NiO (ppm) | 0 | 2 | 5 | 2 | 5 | 5 | 36 | 2 |
| Se (ppm) | 3.0 | 5.9 | 6 | 3.6 | 5.7 | 5 | 5.7 | 4.3 |
| $Cr_2O_3$ (ppm) | 0 | 0 | 0 | 0 | 0 | 0 | 0 | 0 |
| R1 | 0.86 | 0.90 | 0.91 | 0.79 | 1.04 | 0.92 | 1.22 | 1.34 |
| $T_{LA}$ (%) | 79.2 | 71.4 | 71.29 | 73.9 | 69.84 | 74.0 | 68.7 | 77.02 |
| $T_E$ (%) | 60.2 | 55.4 | 56.69 | 58.07 | 51.73 | 58.64 | 48.6 | 60.55 |
| SE | 1.316 | 1.289 | 1.258 | 1.273 | 1.350 | 1.262 | 1.414 | 1.272 |
| $P_{D65}$ (%) | 0.92 | 0.82 | 0.79 | 1.96 | 1.23 | 0.91 | 1.95 | 1.97 |
| $\lambda_d$ (nm) | 517 | 518 | 524 | 495 | 512 | 530 | 537 | 552 |
| $R_a$ | 96.03 | 96.06 | 96.45 | 94.8 | 94.82 | 96.58 | 94.55 | 97.04 |

|  | 24 | 25 | 26 | 27 | 28 | 29 | 30 |
|---|---|---|---|---|---|---|---|
| $Fe_2O_3$ (%) | 0.41 | 0.26 | 0.41 | 0.28 | 0.4 | 0.3 | 0.25 |
| Redox | 0.37 | 0.38 | 0.39 | 0.39 | 0.35 | 0.35 | 0.44 |
| CoO (ppm) | 20 | 0 | 9 | 6 | 0 | 5 | 9 |
| NiO (ppm) | 3 | 7 | 5 | 2 | 65 | 5 | 5 |

TABLE 2-continued

|  | | | | | | | |
|---|---|---|---|---|---|---|---|
| Se (ppm) | 6.8 | 2.9 | 6.6 | 3 | 2 | 3.2 | 6.6 |
| $Cr_2O_3$ (ppm) | 0 | 0 | 0 | 0 | 0 | 100 | 0 |
| R1 | 0.92 | 1.04 | 1.04 | 0.79 | 1.12 | 0.95 | 1.22 |
| $T_{LA}$ (%) | 65.8 | 78.6 | 68.05 | 76.4 | 74.25 | 74.39 | 71.4 |
| $T_E$ (%) | 48.9 | 61.5 | 48.6 | 59.2 | 53.62 | 58.29 | 56.6 |
| SE | 1.346 | 1.278 | 1.400 | 1.291 | 1.385 | 1.276 | 1.261 |
| $P_{D65}$ (%) | 1.87 | 0.98 | 1.3 | 1.86 | 1.52 | 1.97 | 1.92 |
| $\lambda_d$ (nm) | 499 | 515 | 512 | 497 | 513 | 530 | 554 |
| $R_a$ | 94.03 | 96.1 | 94.28 | 95.01 | 94.12 | 94.02 | 97.01 |

TABLE 3

| | 31 | 32 | 33 | 34 | 35 | 36 | 37 | 38 | 39 | 40 | 41 | 42 | 43 | 44 |
|---|---|---|---|---|---|---|---|---|---|---|---|---|---|---|
| $Fe_2O_3$ (%) | 0.4 | 0.42 | 0.25 | 0.24 | 0.24 | 0.24 | 0.42 | 0.4 | 0.35 | 0.38 | 0.4 | 0.4 | 0.4 | 0.4 |
| Redox | 0.35 | 0.38 | 0.48 | 0.50 | 0.47 | 0.45 | 0.31 | 0.30 | 0.31 | 0.32 | 0.35 | 0.35 | 0.35 | 0.25 |
| CoO (ppm) | 0 | 0 | 0 | 15 | 20 | 10 | 9 | 9 | 0 | 10 | 25 | 5 | 15 | 15 |
| NiO (ppm) | 10 | 10 | 25 | 11 | 3 | 3 | 5 | 7 | 0 | 45 | 0 | 100 | 35 | 0 |
| Se (ppm) | 4 | 5.1 | 3.6 | 5.9 | 6.4 | 4.4 | 5 | 4.5 | 3 | 3.6 | 4.6 | 5 | 9 | 5 |
| $Cr_2O_3$ (ppm) | 0 | 0 | 0 | 0 | 0 | 0 | 0 | 0 | 0 | 0 | 0 | 0 | 0 | 0 |
| R1 | 1.09 | 1.09 | 1.04 | 0.91 | 0.89 | 0.86 | 1.09 | 1.09 | 1.09 | 1.11 | 0.68 | 1.57 | 1.43 | 1.14 |
| $T_{LA}$ (%) | 74.16 | 71.72 | 75.92 | 70.79 | 69.6 | 74.79 | 71.3 | 72.4 | 77.7 | 71.8 | 67.5 | 68.2 | 64.1 | 71.6 |
| $T_E$ (%) | 53.6 | 50.14 | 57.35 | 55 | 55.61 | 58.56 | 53.6 | 55.5 | 59.4 | 55.2 | 51.2 | 50.5 | 48.7 | 58 |
| SE | 1.384 | 1.430 | 1.324 | 1.287 | 1.252 | 1.277 | 1.331 | 1.306 | 1.309 | 1.301 | 1.318 | 1.351 | 1.31 | 1.23 |
| $P_{D65}$ (%) | 1.29 | 1.38 | 1.08 | 0.83 | 0.74 | 0.86 | 1.2 | 1.15 | 1.11 | 1.25 | 3.92 | 3.99 | 3.92 | 1.19 |
| $\lambda_d$ (nm) | 516 | 518 | 515 | 517 | 516 | 511 | 517 | 517 | 516 | 517 | 490 | 558 | 562 | 530 |
| $R_a$ | 94.72 | 94.3 | 95.59 | 96 | 96.29 | 96.13 | 95.09 | 95.35 | 95.65 | 95.09 | 92.54 | 95.82 | 96.43 | 96.22 |

The invention claimed is:

1. A glass composition comprising, in weight percent:

| | |
|---|---|
| $SiO_2$ | 64-75% |
| $Al_2O_3$ | 0-5% |
| $B_2O_3$ | 0-5% |
| CaO | 5-15% |
| MgO | 0-5% |
| $Na_2O$ | 10-18% |
| $K_2O$ | 0-5% | and coloring agents which comprises, in weight percent:

| | |
|---|---|
| $Fe_2O_3$ (total iron) | 0.2-0.45% |
| Se | 2-8 ppm |
| CoO | 0-20 ppm |
| NiO | 0-80 ppm | wherein said coloring agents satisfy the following relationship:

$0.7 < (200 \times NiO) + (5000 \times Se) + (6 \times Fe^{3+})/(875 \times CoO) + (24 \times Fe^{2+}) < 1.6$ wherein the NiO, Se, $Fe^{3+}$, CoO and $Fe^{2+}$ contents are expressed in ppm, $Fe^{3+}$ is the content of ferric iron expressed in the form of $Fe_2O_3$ and $Fe^{2+}$ is the content of ferrous iron expressed in the form of FeO, wherein the composition has an excitation purity of less than or equal to 2%, a redox from 0.28 to 0.5, an overall light transmission under illuminant A ($T_{LA}$) greater than 65% and a selectivity (SE) of greater than 1.25, when measured for a thickness of 3.85 mm.

2. The composition as claimed in claim 1, wherein the composition comprises:

| | |
|---|---|
| $Fe_2O_3$ (total iron) | 0.2-0.3% |
| Se | 2-8 ppm |
| CoO | 0-20 ppm |
| NiO | 0-5 ppm | and the composition has a redox of greater than 0.4.

3. The composition as claimed in claim 2, wherein the composition has an excitation purity of less than 1%.

4. The composition as claimed in claim 2, wherein the composition does not comprise NiO and comprises:

| | |
|---|---|
| $Fe_2O_3$ (total iron) | 0.2-0.25% |
| Se | 4-7 ppm |
| CoO | 10-20 ppm. |

5. The composition as claimed in claim 1, wherein the composition comprises:

| | |
|---|---|
| $Fe_2O_3$ (total iron) | 0.35-0.45% |
| Se | 2-8 ppm |
| CoO | 0-10 ppm |
| NiO | 0-80 ppm | and the composition has a redox of greater than or equal to 0.34.

6. The composition as claimed in claim 1, wherein the composition has a selectivity of greater than 1.3.

7. The composition as claimed in claim 5, wherein the composition comprises:

|   |   |
|---|---|
| Fe$_2$O$_3$ (total iron) | 0.39-0.45% |
| Se | 3-6 ppm |
| CoO | 0-6 ppm |
| NiO | 0-15 ppm. |

8. The composition as claimed in claim 1, wherein the composition has an excitation purity of less than or equal to 1%.

9. The composition as claimed in claim 1, wherein the composition has a color rendering index (Ra) of at least 94.

10. The composition as claimed in claim 1, wherein the composition further comprises at least one optical absorption agent selected from the group consisting of CeO$_2$, TiO$_2$, V$_2$O$_5$, WO$_3$ and La$_2$O$_3$.

11. The composition as claimed in claim 10, wherein the total content of said optical absorption agent is less than 1% by weight.

12. A window, comprising at least one glass sheet which comprises the composition as claimed in claim 1.

13. The window as claimed in claim 12, wherein the sheet has a thickness between 0.8 and 10 mm.

14. The window as claimed in claim 13, wherein the sheet has an overall light transmission under illuminant A (T$_{LA}$) of at least 70% for a thickness of 3.85 mm.

15. The composition as claimed in claim 6, wherein the composition comprises:

|   |   |
|---|---|
| Fe$_2$O$_3$ (total iron) | 0.39-0.45% |
| Se | 3-6 ppm |
| CoO | 0-6 ppm |
| NiO | 0-15 ppm. |

16. The composition as claimed in claim 1, wherein the composition has a color rendering index (Ra) greater than 96.

\* \* \* \* \*